Sept. 18, 1962 J. R. NOONAN 3,054,990

NOISE ELIMINATOR

Filed Sept. 24, 1958 4 Sheets-Sheet 1

INVENTOR.
JAMES R. NOONAN

BY [signature]

Sept. 18, 1962 J. R. NOONAN 3,054,990

NOISE ELIMINATOR

Filed Sept. 24, 1958 4 Sheets-Sheet 4

United States Patent Office 3,054,990
Patented Sept. 18, 1962

3,054,990

NOISE ELIMINATOR

James R. Noonan, Hyde Park, N.Y., assignor to International Business Machines Corporation, New York, N.Y., a corporation of New York Filed Sept. 24, 1958, Ser. No. 763,013
6 Claims. (Cl. 340—174.1)

This invention relates to a system for avoiding the effect of noise encountered in the interrecord space of magnetic records. The invention is applicable to the processing of all types of magnetic record media. However, since the invention was conceived in connection with the processing of magnetic records in the form of tape, the same will be described in respect thereto whenever reference to a specific magnetic record medium appears desirable.

A number of tape defects, such as random flecks of oxide, metallic particles, tape splices and the like, will cause the generation of spurious signals when magnetic tape data is being read into a computer or a data processing system. These spurious signals are commonly referred to as "noise." Noise causing defects may appear in normal course in the interrecord space on tape, or they may be purposely relegated to the interrecord space when a record is originally written by utilizing known recording techniques effective for the purpose.

The invention herein is predicated on the control of the signal transmission system by means of tape marks recorded on the tape such that they define the beginning and end of the interrecord space and separate the valid records on the tape. The control circuits are so designed as to recognize the tape marks so disposed and in response thereto control the data transmission circuits to block transmission of any noise that may be encountered within the interrecord space.

The specific nature of the system herein can be understood best by reference to the attached drawings, in which.

Tape reading equipment ordinarily associated with electronic computers and electronic data processing systems involves a pair of character registers through which characters are transmitted from magnetic tape to the data processing circuits. Alternatively, the tape reading circuits, if in a module separate from the processing circuits, may involve a so-called read register while the processing system may have a so-called line register. Two or more registers are ordinarily employed to overcome problems arising from tape skew. In the system herein, data from magnetic record tape is read character-by-character into a read register such that skew affected bits comprising a character are available in the read register for simultaneous transfer to a line register.

It is the purpose of this invention to prevent the transfer of noise or spurious signals from the line register to the data processing circuits.

Figure 6:
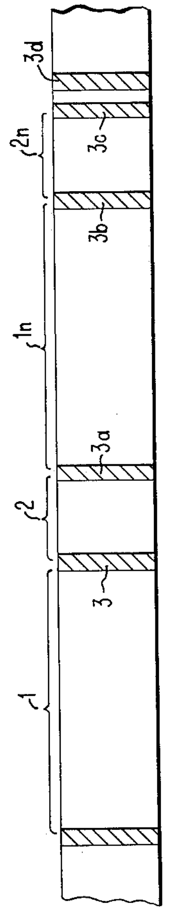
FIG. 6 is a diagrammatic illustration of a section of tape having recorded thereon a plurality of records separated by interrecord gaps and showing thereon a series of tape marks utilized for control of the circuits herein.

In FIG. 6, there has been represented a section of magnetic tape record which includes a plurality of records 1–1*n*. Each of the records on tape is separated from the others by means of interrecord gaps 2–2*n*. The length of the records may vary as required by the type of information stored therein, while the length of the interrecord gaps will vary in accordance with the design of the tape recording equipment employed for generating the record. In conventional recording equipment, the interrecord gaps are of the order of ¾ of an inch in length.

Noise read from magnetic tape is especially troublesome because of tape spacing problems resulting therefrom in the tape equipment which is commonly adapted to back space and reread records which are indicated to the system as being invalid. As a consequence of the difficulties encountered, equipment has been designed for deliberately relegating tape defects and noise generally to the interrecord space on the tape where it can be dealt with more effectively. Therefore, it is desirable to avoid the effect of noise appearing in the interrecord gaps 2–2*n* whether or not that noise appears in the gaps in normal course, or whether it has been deliberately relegated to the interrecord gaps by the techniques known for that purpose.

The tape marks 3–3*c* of FIG. 6, by which the interrecord gaps are defined and by which the several records on the tape are separated from each other, may consist of any suitable character recorded on the tape which will be recognized by the tape reading circuits as a tape mark. In the exemplary embodiment herein, the tape mark is represented by the binary –1–, –2–, –4– and –8–. In the example as described, the tape has seven information channels including a channel for each of the above noted four binary bits, together with three additional channels designated A, B and C. Under the conditions stated, the circuits must, therefore, be designed so that the presence of binary bits –1–, –2–, –4– and –8– and the absence of bits –A–, –B– and –C– will be recognized as a tape mark.

By reference to FIG. 6, it will be noted that closely following the tape mark 3*c*, is still a further tape mark 3*d*. The tape mark 3*d* represents the tape mark which is conventionally employed at the end of a file of records, and for this reason it is sometimes referred to as the end-of-file tape mark. It follows, therefore, that the circuits of the system must be so designed as to recognize also the end-of-file tape mark when one appears. Herein the tape marks which define the interrecord gaps and the end-of-file tape mark are composed of bits having an identical configuration.

Figure 1:
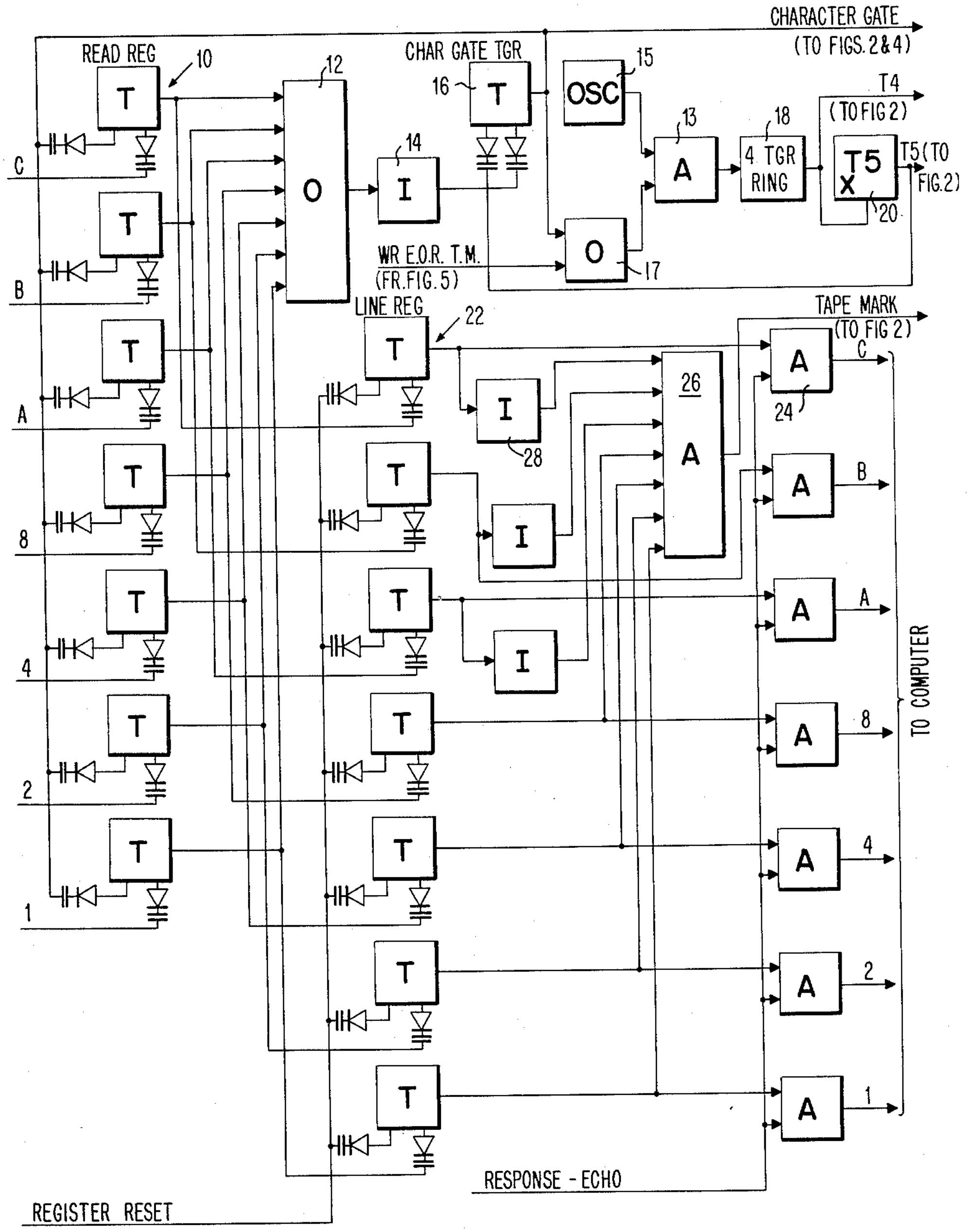
FIG. 1 is a diagrammatic representation of data input circuits including a pair of character registers and means by which tape marks can be recognized.

When magnetic tape is read in a tape reading system, a change in the flux pattern on the tape represents a bit of a coded character when such change in flux pattern is detected in the coils of the tape reading heads. The pulses generated in the reading head coils are amplified and are imposed upon a plurality of input lines –C–, –B–, –A–, –8–, –4–, –2– and –1– of FIG. 1. These lines constitute inputs to a read register 10 which is composed of seven bistable triggers, each comprising a register position. While seven register positions have been illustrated herein, the number thereof will depend on the number of bit channels of the tape to which the system is adapted, and the number can, therefore, be varied to agree with the number of channels on the tape for which the equipment is designed.

The tape generated pulses will arrive at the triggers of the read register 10 during the period of a character gate which is a timing interval initiated by the arrival in the read register of the first bit of a character read from tape. Herein, all of the triggers of the read register are connected to an OR circuit 12 which permits the passage therethrough of a pulse on any one of its input lines. A pulse passing through the OR circuit 12 is inverted in an inverter 14, the output of which turns on a Character Gate trigger 16. The output of the Character Gate trigger 16 is the signal Character Gate which gates the data bits into the read register and which resets the read register upon the fall thereof. When the Character Gate trigger 16 is turned on, it sets into operation a ring of four triggers 18 which has a timing output T4, and which by way of a binary trigger 20 also produces an overlapping timing pulse T5.

The ring of four triggers 18 is actuated by the output of an AND circuit 13 which has as one input thereto the pulses of a free running oscillator 15. When the Character Gate trigger 16 is turned on, it conditions the second input to the AND circuit 13 such that pulses from the oscillator 15 will operate the four trigger ring 18. It will be noted that the output of the Character Gate trigger 16 is transmitted to the AND circuit 13 by way of an OR circuit 17 which has a second input which will be utilized when writing a tape mark upon tape, as to be explained at a later point herein.

The output of the trigger 20 is connected to the Character Gate trigger 16 such that the Character Gate trigger 16 is turned off upon the fall of the T5 timing pulse. When the Character Gate trigger 16 is turned off and the character gate pulse falls, any of the triggers of the read register 10, which were turned on by the arrival of a tape generated pulse, will now be turned off such that pulses will be sent to corresponding triggers of a line register 22. Any of the line register triggers that are turned on will condition one input of the associated one of a plurality of AND circuits 24 and the potential so impressed on the AND circuits 24 will be gated into the data processing circuits at an appropriate time by means of a signal Response-Echo, which conditions the other input of each of the AND circuits 24.

The triggers of the line register 22 are associated with circuits designed to recognize a tape mark and to emit a signal Tape Mark upon such recognition. It has been previously stated that a tape mark is composed of the binary –1–, –2–, –4– and –8– bits and by the absence of the –A–, –B– and –C– bits. In order to recognize this condition, the –1–, –2–, –4– and –8– triggers of the line register are connected directly to an AND circuit 26; while the –A–, –B– and –C– triggers of the line register are connected to the same AND circuit by way of inverters 28. It can be seen, as a consequence of this circuit configuration, that the AND circuit 26 will emit a pulse when a bit has been stored in the –1–, –2–, –4– and –8– triggers of the line register, but no bits have been stored in the –A–, –B– and –C– triggers of that register. The line register can be reset by simultaneously impressing on the triggers thereof the signal Register Reset.

It will be pointed out hereinafter that the signal Response-Echo, which gates the data pulses through the AND circuits 24, is essentially generated by a signal Response, which is an output of the circuits of FIG. 2 and which is present only under certain tape mark conditions, as to be pointed out hereinafter.

If interrecord gap noises should cause one or more of the triggers of the read register 10 to be turned on, such noise will generate the signal Character Gate which will allow the noise to be set into the corresponding triggers of the line register 22. However, it will not be transmitted to the output circuits of the line register because the signal Response will be suppressed at this time. It may be stated at this point that the signal Response is transmitted to the data processing system to indicate to the data processing circuits that a character is stored in the line register and is available for transmission to the data processing circuits as soon as the data processing system is conditioned to receive the character. It is the presence of a character in the line register in conjunction with the ability of the data processing system to receive that character that results in the gating signal Response-Echo. Whenever noise from the interrecord gap is read into the triggers of the read register 10, it will be cleared therefrom by the fall of the signal Character Gate, and while such noise is transferred to the corresponding triggers of the line register 22, that register will be reset by the signal Register Reset before the arrival of the next Response-Echo signal. Therefore, whatever noise may be in the input system, as a result of interrecord gap reading, it will be cleared from the system before the Response signal is effective to gate the noise to the input circuits of the system. This process of eliminating noise can continue for any number of noise pulses unless they are so spaced timewise as to follow each other within 150 microseconds. This contingency is not likely.

When the tape mark is recognized in the line register, the signal Tape Mark will be generated at the output of the AND circuit 26, as stated. The signal Tape Mark is transmitted to the circuits of FIG. 2 where it constitutes one input to a 3-way AND circuit 30. The other inputs to the AND circuit 30 are the timing pulses T4 and T5. Thus, when the three inputs to the AND circuit 30 are positive, the AND circuit will conduct and transmit a potential through a cathode follower 32 whose output is connected to a Tape Mark trigger 34. Thus, when a pulse is transmitted through the cathode follower 32 to the Tape Mark trigger 34, the Tape Mark trigger 34 will be turned on.

Figure 2:
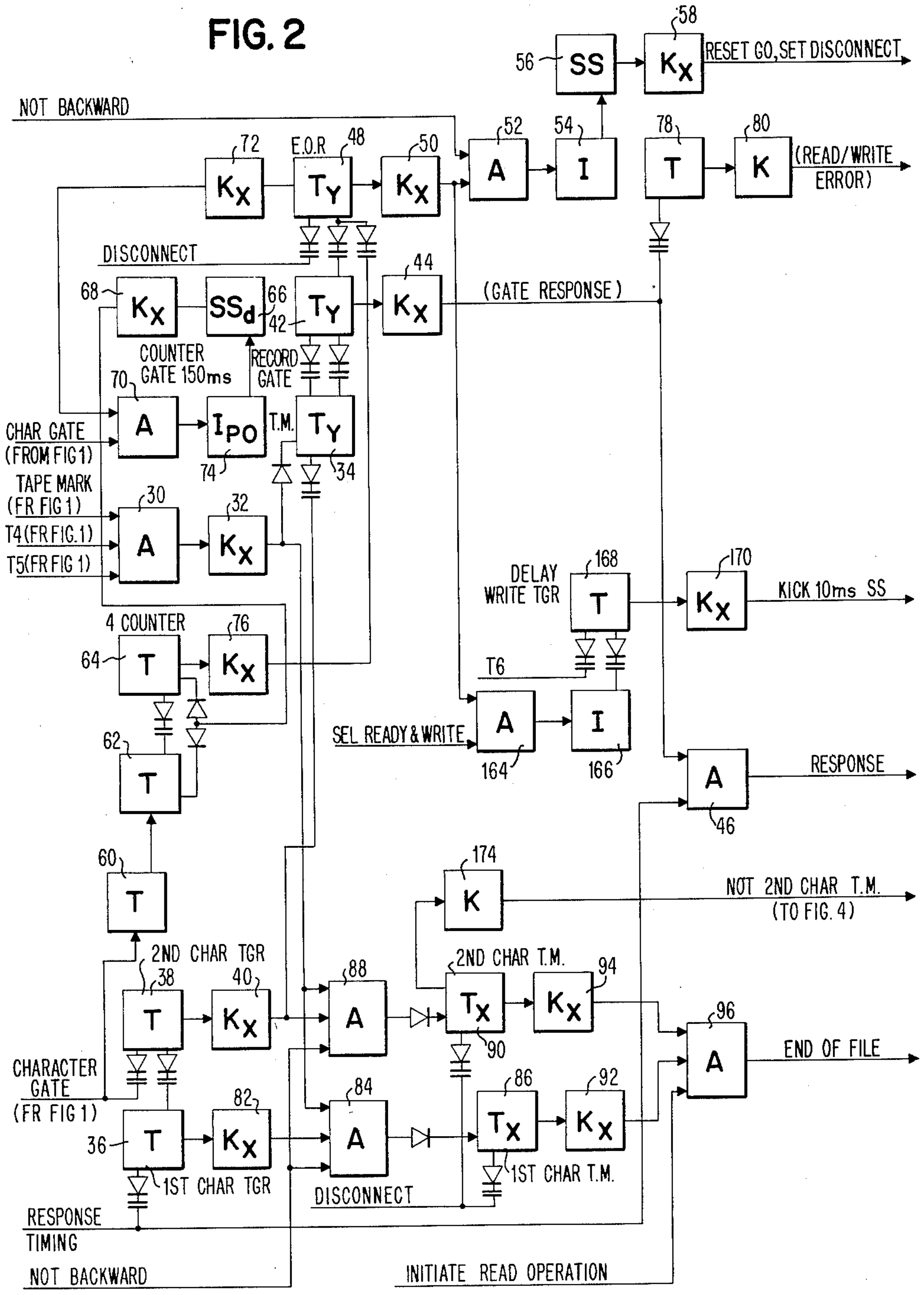
FIG. 2 is a diagrammatic representation of the circuits designed to respond to the recognition of tape marks and to produce a data transmission control signal in response thereto.

In FIG. 2, a signal Response Timing is an input to a First Character trigger 36, the signal Response Timing resulting from the fall of each Character Gate signal. The First Character trigger 36 is initially turned on such that it is conducting on its left side. Therefore, the signal Response Timing will turn off the First Character trigger 36. The fall of the output of the First Character trigger 36 will turn on a Second Character trigger 38. The next Character Gate signal, which is an input to the Second Character trigger 38, will reset the Second Character trigger 38 and the fall of the output at the right of the Second Character trigger 38, transmitted by way of a cathode follower 40, will turn the Tape Mark trigger 34 off. When the Tape Mark trigger 34 is turned off, it will turn on a Record Gate trigger 42 to which its output is connected. The output potential at the right side of the Record Gate trigger 42 is transmitted through a cathode follower 44 as the signal Gate Response. It is the signal Gate Response which is utilized to generate the signal Response, as stated above. It will be noted that the output of the cathode follower 44 is an input to an AND circuit 46 whose other input is the aforementioned signal Response Timing. Therefore, each time the Record Gate trigger 42 is turned on, and at the fall of the signal Character Gate, from which the signal Response Timing is generated, the AND circuit 46 will transmit the signal Response.

The foregoing process continues for each character of a record until the end-of-file tape mark is recognized, it being remembered that the end-of-file tape mark is that which immediately follows a tape mark at the end of a record file, such as the end-of-file tape mark *3d* of FIG. 6. At this time, the Tape Mark trigger 34 is again turned on by reason of the positive inputs Tape Mark, T4 and T5 at the AND circuit 30. The output at the left of the Tape Mark trigger 34 turns off the Record Gate trigger 42 thereby inhibiting further Response signals from the AND circuit 46. Also, the fall of the output of the Record Gate trigger 42 turns on an EOR (End of Record) trigger 48 and the output at the right of the EOR trigger 48, which is transmitted by way of a cathode follower 50, is an input to an AND circuit 52 whose other input is the signal Not Backward. The signal Not Backward is generated in the control circuits of the tape reading unit and indicates that the tape reading unit is operating in a forward direction. Therefore, the AND circuit 52 emits a pulse which is transmitted to an inverter 54 whose output triggers a single shot multivibrator 56. The single shot multivibrator 56 has a period of 400 microseconds and upon the fall thereof, it generates and emits a signal Reset Go, Set Disconnect. This latter signal is transmitted through a cathode follower 58. The signal Reset Go, Set Disconnect signifies the end of a tape reading operation and is utilized to stop the tape drive unit which is a condition precedent to the processing of the next instruction by the data processing circuits. The fall of the signal Disconnect, resets the EOR trigger 48.

If the first tape mark is not recognized, the signal Response is never generated and nothing is transmitted to the data processing circuits. However, to insure that valid information is not ignored, there is provided herein a counter of 4 to position tape under the tape reading heads such that it may be back spaced for a rereading operation; that is to say, the counter of 4 will cause tape to run under the reading heads for the length in which a valid record would be contained. The fall of the first Character Gate signal to arrive, which signal is an input to the Second Character trigger 38 is also an input to a trigger 60. Therefore, the fall of the Character Gate signal will turn on the trigger 60, and the fall of the next Character Gate signal will turn off the trigger. When the trigger 60 is turned off, it will turn on a trigger 62, such that after two more Character Gate signals, the trigger 62 will be turned off. When the trigger 62 is turned off, it in turn will turn on a count of 4 trigger 64. In case of additional Character Gate signals, the count of 4 trigger 64 will be unaffected. While the triggers 60, 62 and 64 are being operated by the Character Gate signals, the same Character Gate signals will initiate and maintain a Counter Gate hold-over single shot multivibrator 66 whose period is 150 microseconds; this time being somewhat in excess of the expected rate of character flow. The Character Gate signals are an input to an AND circuit 70 whose other input is the output at the left of the EOR trigger 48, which is transmitted by way of a cathode follower 72 to the input side of the AND circuit 70. The output of the AND circuit 70, transmitted by way of an inverter 74, is the operating input for holding over the Counter Gate single shot 66. After the arrival of the last character, the Counter Gate single shot multivibrator 66 will fall and thereby will reset the count of 4 trigger 64 by way of the cathode follower 68.

When the count of 4 trigger 64 is turned off, it will transmit a pulse through a cathode follower 76, whose output is connected to the EOR trigger 48 and thereby turns on the EOR trigger 48 such that end of record procedures are initiated, as previously described. In addition, a control pulse indicating a reading error is generated. The signal in question is Read/Write Error which is transmitted to the tape processing circuits to cause them to go into a corrective routine. In this event, when the EOR trigger 48 is turned on by the fall of the output of the count of 4 trigger 64, rather than by the fall of the output of the Record Gate trigger 42, a Read/Write Error trigger 78 will remain on and thereby transmit a signal through a cathode follower 80 which is the signal Read/Write Error. This signal is sampled at disconnect time and utilized to back space the tape and reread the record which was indicated as having been incorrectly read.

In case of failure to recognize the tape mark at the end of a record, Record Gate trigger 42 remains turned on and the tape is positioned by way of the output of the count of 4 trigger 64 such that the signal Read/Write Error is generated as it was in the case of failure to read the first tape mark.

The AND circuit 70 allows two Character Gate signals to drive the Counter Gate single shot multivibrator 66 until the EOR trigger 48 has been turned on, thus bringing down the output of the cathode follower 72 connected therebetween and the AND circuit 70. When the potential at the output of the cathode follower 72 drops, the AND circuit 70 will be deconditioned.

A circuit has been provided to differentiate between the tape mark which defines the interrecord gap and the tape mark which is written at the end of a file of records, and which has been referred to herein as the end-of-file tape mark. An output of the First Character trigger 36 is transmitted by way of a cathode follower 82 as an input to an AND circuit 84. A second input to the AND circuit 84 is the output of the AND circuit 30 which, as stated, transmits a pulse upon receipt of the signal Tape Mark and the timing pulses T4 and T5. The third input to the AND circuit 84 is the signal Not Backward, indicating that the tape reading unit is operating in a forward direction. When all of the inputs to the AND circuit 84 are positive, the output therefrom will serve to turn on a First Character Tape Mark trigger 86. The fall of the signal Response Timing upon reading of the first character turns off the First Character trigger 36 and the latter turns on the Second Character trigger 38 to which it is connected. The output at the right of the Second Character trigger 38 is transmitted through the cathode follower 40 and conditions one input to an AND circuit 88. A second input to the AND circuit 88 is conditioned by the output of the AND circuit 30, while the third input to the AND circuit 88 is conditioned by the signal Not Backward. When the AND circuit 88 emits a signal, it turns on a Second Character Tape Mark trigger 90. Thus, a second character is recognized as a tape mark. When both the First Character Tape Mark trigger 86 and the Second Character Tape Mark trigger 90 are turned on as explained above, they respectively transmit a potential from cathode followers 92 and 94. The output of these cathode followers is an input to an AND circuit 96. The AND circuit 96 has a third input which is the signal Initiate Read Operation, which is transmitted throughout a tape reading operation. Thus, there is produced at the output of the AND circuit 96 a signal End Of File which required recognition of successive tape marks and indicates that a complete file of records has been read. As the tape reading operation is terminated, there is generated a signal Disconnect which constitutes the reset signal for the First and Second Character Tape Mark triggers 86 and 90.

Figure 3:
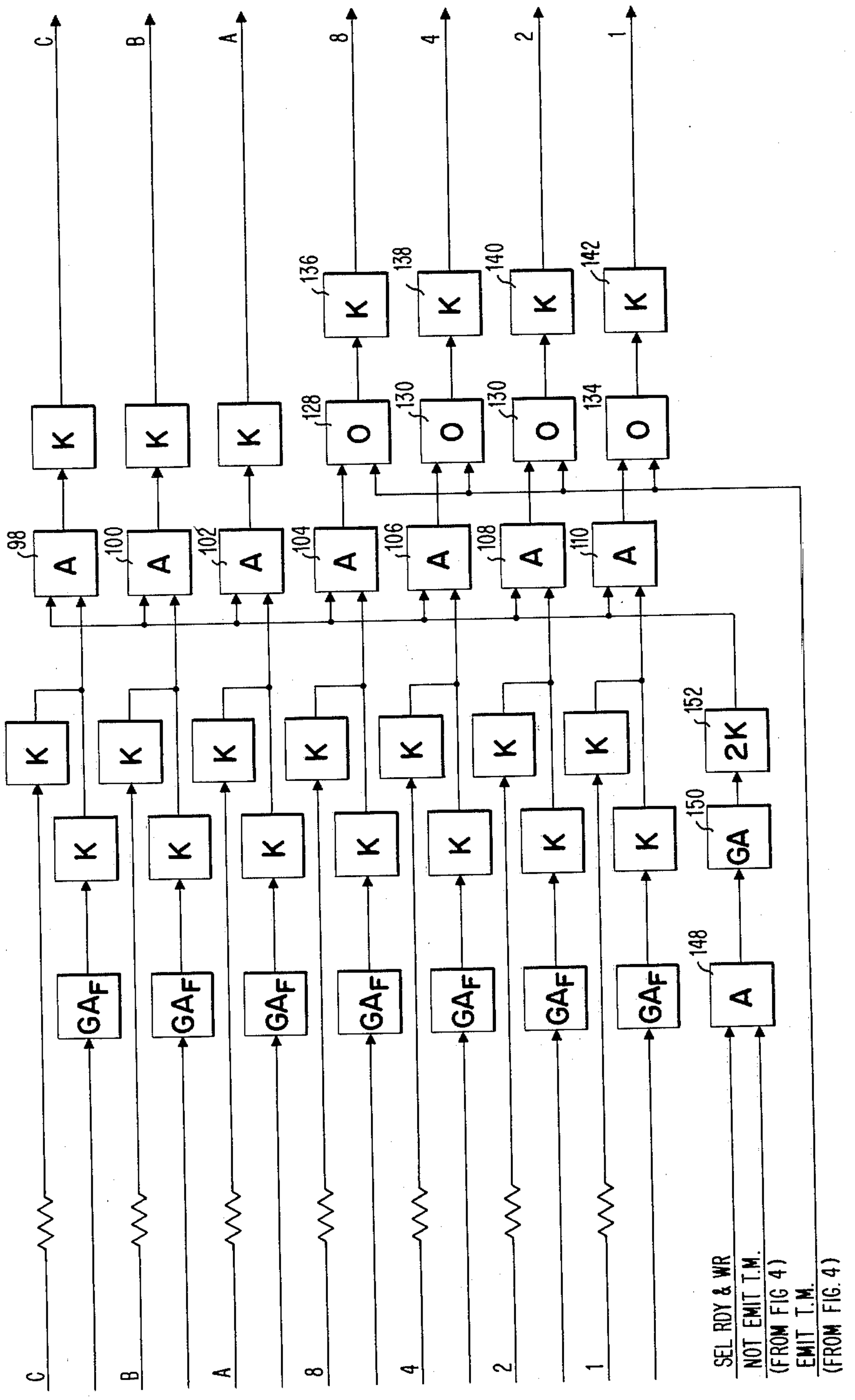
FIG. 3 is a diagrammatic representation of circuits utilized to write records on tape, including circuits for generating a tape mark.

When the data processing system is in the act of writing output information upon tape, it utilizes writing busses and gates such as those shown in FIG. 3. Each of the output lines, including their level setting components, feeds into an AND circuit. Thus, in FIG. 3, the several output lines constitute inputs to AND circuits 98–110, respectively. When a character bit is impressed on one or more of the AND circuits 98–110, that bit is gated through these circuits to the tape writing busses when the AND circuits are simultaneously conditioned by a gating pulse. In order to write a tape mark on tape, the circuits of FIG. 3 are controlled to write binary bits –1–, –2–, –4– and –8– whenever a tape mark is called for.

Figure 4:
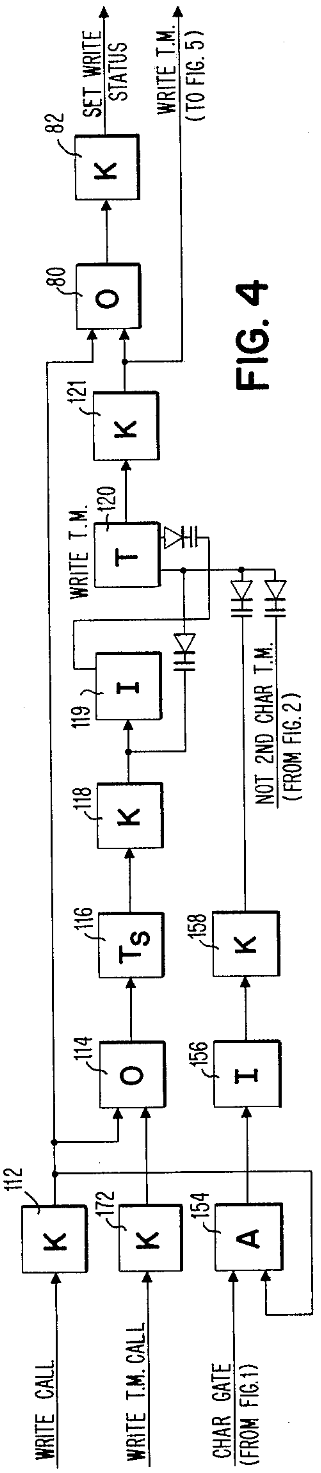
FIGS. 4 and 5 are diagrammatic representations of circuits controlling the writing of tape marks upon tape.
Figure 5:
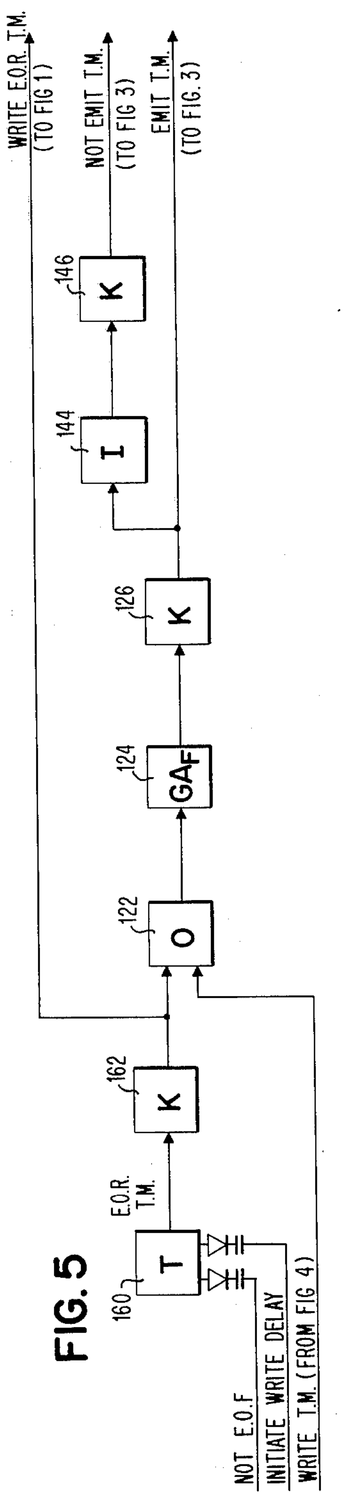

The circuits of FIGS. 4 and 5 show how it is determined that a tape mark is to be written by appropriately controlling the write bus circuits of FIG. 3.

The command to write a tape mark originates in the circuits of FIG. 4, wherein the signal Write Call is impressed on a Write TM trigger 120. By reference to FIG. 4, it will be noted that the signal Write Call is an input to a cathode follower 112 and that it passes from the cathode follower 112 through an OR circuit 114, a Schmidt trigger 116, a cathode follower 118 and to an input of the Write TM trigger 120. When the Write TM trigger is turned on, it emits a pulse by way of a cathode follower 121 which is the signal Write TM. The signal Write TM is an input to the circuits of FIG. 5 where the signal Emit TM is generated, this latter signal being the one that is used to condition the circuits of FIG. 3 for writing the tape mark.

The signal Write TM is an input to an OR circuit 122 of FIG. 5; the output of the OR circuit 122 being transmitted by way of a grounded grid amplifier 124 and a cathode follower 126 as the signal Emit TM, which is transmitted to the circuits of FIG. 3 where it is an input to each of the OR circuits 128 through 134. The output of the OR circuits 128 through 134 by way of respectively associated cathode followers 136 through 142 condition respectively the –8–, –4–, –2– and –1– writing busses.

The signal Emit TM of FIG. 5 is inverted in an inverter 144, the output of which is passed through a cathode follower 146 as the signal Not Emit TM which is also transmitted to the circuits of FIG. 3 where it is fed into an AND circuit 148 together with the condition SEL RDY & WR, which is positive when the tape drive has been selected for operation and has been placed in writing status. The output of the AND circuit 148 is passed through a grounded grid amplifier 150 and a cathode follower 152 as an input to the AND circuits 98 through 110 in order to block any information that may be on the input lines of these AND circuits.

When the first tape mark has been written, the resulting echoes are transmitted from the tape unit to the read register. The rise of the read register will start a Character Gate signal which will be reset by the fall of the T5 timing pulse just as during the operation of reading from tape. The fall of the signal Character Gate in FIG. 4 turns off the Write TM trigger 120, this signal being transmitted through an AND circuit 154, an inverter 156 and a cathode follower 158; the second input of the AND circuit 154 being conditioned by the signal Write Call, which is the output of the cathode follower 112.

When the Write TM trigger 120 is turned off, it will restore the writing busses of FIG. 3 to their normal condition, i.e., deconditioned, and will remove the block from the writing circuits by causing the gating input to the AND circuits 98 through 110 to go positive. Now the writing busses can respond to the data transmitted from the data processing circuits for the writing of output information on tape.

Characters are written out on tape until the end of a record is recognized in the data processing circuits, such that the signal Write Call impressed on the cathode follower 112 of FIG. 4 is brought down. The falling of the signal Write Call causes the signal Initiate Write Delay (FIG. 5) to fall and thereby turn on an EOR (End of Record) TM trigger 160. When the EOR TM trigger 160 is turned on, the output at its right side is fed into a cathode follower 162 such that the signals Emit TM and Not Emit TM are generated as previously explained, excepting that in this instance they are generated by the signal Initiate Write Delay rather than by the signal Write TM, as previously. Therefore, the end-of-file tape mark is recorded.

The output of the cathode follower 162, as the signal Write EOR TM, is used to gate the four trigger ring 18 for generating a writing pulse. This is necessary because the write call gate had previously been furnished by the signal Write Call, while at this time the signal Write Call is absent. The signal Write EOR TM is transmitted to the OR circuit 17 (FIG. 1) through which it passes to condition the AND circuit 13 to pass operating pulses to the four trigger ring 18.

The echoes for the end-of-file tape mark are sent to the read register and are recognized as a tape mark, such that upon the arrival of the signals T4 and T5, the three inputs to the AND circuit 30 (FIG. 2) are positive. The AND circuit 30 by way of cathode follower 32 will turn on the Tape Mark trigger 34 which, in turn, turns off the Record Gate trigger 42. The Record Gate trigger 42 will turn on the EOR trigger 48 thereby causing a positive transient at the output of the cathode follower 50. This output is conditioned at an AND circuit 164 by the signal SEL Ready & Write, which, as explained before, is present so long as the tape drive has been selected for operation and is conditioned for writing. The output of the AND circuit 164 is passed by way of an inverter 166 to a Delay Write trigger 168 which is thereby turned on. When the Delay Write trigger 168 is turned on, it transmits an output potential by way of a cathode follower 170 whose output is the signal Kick 10 MS SS. This signal is utilized to trigger a 10 microsecond multivibrator (not shown) which resets the write triggers in the tape drive unit. Resetting these triggers causes the writing of a longitudinal redundancy check character on the tape, which forms no part of this invention.

In order to write the end-of-file tape mark, it is, of course, necessary as explained above, to write two successive tape marks in order to differentiate between the tape mark appearing at the end of a file of records and those defining the interrecord gaps. The signal Write TM Call which is an input to a cathode follower 172 (FIG. 4) turns on the Write TM trigger 120 just as this trigger was turned on by the Write Call signal imposed on the cathode follower 112, it being noted that the output of the cathode followers 112 and 172 are both inputs to the OR circuit 114. When the Write TM trigger 120 is turned on, it conditions the write busses and causes a writing pulse in the same manner as when the previous tape mark was recorded. However, since the AND circuit 154 is not conditioned during the presence of the signal Write TM Call, the output of the Second Character TM trigger 90 (FIG. 2) by way of a cathode follower 174 emits a signal Not Second Character TM which is an input to the Write TM trigger 120 of FIG. 4 and thereby resets the latter trigger. The backspacing operating during the writing upon tape utilizes the counter of 4 comprising triggers 60, 62 and 64 (FIG. 2) in connection with the reading from tape and the failure to recognize the first tape mark when so reading. This insures that noise pulses will not cause mispositioning of the tape under the read/write heads during the backspacing operation.

While the fundamentally novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. In a system for reading and writing magnetic tape records wherein records are separated from each other by a multi-bit first and second tape mark having an intervening interrecord gap therebetween; a character register having inputs for receiving the bits of a character read from a magnetic record, output character transmission circuits extending from said register, means for recognizing a first tape mark in said character register, means responsive to an output of said recognizing means for disabling said transmission circuits upon recognition of a first tape mark, means for recognizing a second tape mark in said register, means responsive to said last named recognizing means for rendering operative said transmission circuits to transmit characters following the reading of a second tape mark, and means operative to reset said register immediately before said transmission circuits are rendered operative after recognizing a second tape mark.

2. In a system for reading and writing magnetic tape records wherein records are separated from each other by a multi-bit first and second tape mark having an intervening interrecord gap therebetween; a character register composed of a plurality of bi-stable triggers each having an input for receiving a bit of a character read from a magnetic record, an output bit transmission circuit extending from each of said triggers, means for recognizing a first tape mark in said character register, means responsive to an output of said recognizing means for disabling said transmission circuits upon recognition of a first tape mark, means for recognizing a second tape mark in said register, means responsive to said last named recognizing means for rendering operative said transmission circuits to transmit characters following the reading of a second tape mark, and means operative to reset said register immediately before said transmission circuits are rendered operative after recognizing a second tape mark.

3. In a system for reading and writing magnetic tape records wherein records are separated from each other by a multi-bit first and second tape mark having an intervening interrecord gap therebetween; a character register having inputs for receiving the bits of a character read from a magnetic record, output character transmission circuits extending from said register, means for generating and impressing a gating signal upon said transmission circuits during the reading of valid characters whereby such characters are gated through said transmission circuits, means for recognizing a first tape mark in said character register, means responsive to an output of said recognizing means for suppressing said gating signal upon recognition of a first tape mark, means for recognizing a second tape mark in said register, means responsive to said last named recognizing means for rendering operative said gating signal to transmit characters following the reading of a second tape mark, and means operative to reset said register immediately before said gating signal is rendered operative to transmit characters following the reading of a second tape mark.

4. In a system for reading and writing magnetic tape records wherein records are separated from each other by a multi-bit first and second tape mark having an intervening interrecord gap therebetween; a character register having inputs for receiving the bits of a character read from a magnetic record, output character transmission circuits extending from said register, a coincidence circuit for recognizing a first tape mark in said character register, means responsive to an output of said coincidence circuit for disabling said transmission circuits upon recognition of a first tape mark, means including said coincidence circuit for recognizing a second tape mark in said register, means responsive to said last named recognizing means for rendering operative said transmission circuits to transmit characters following the reading of a second tape mark, and means operative to reset said register immediately before said transmission circuits are rendered operative after recognizing a second tape mark.

5. In a system for reading and writing magnetic tape records wherein records are separated from each other by a multi-bit first and second tape mark having an intervening interrecord gap therebetween; a character register having inputs for receiving the bits of a character read from a magnetic record, output character transmission circuits extending from said register, said transmission circuits including a plurality of coincidence units, means for recognizing a first tape mark in said character register, a connection between said recognizing means and said coincidence units for disabling the same upon recognition of a first tape mark, means for recognizing a second tape mark in said register, means responsive to said last named recognizing means for rendering operative said coincidence units to transmit characters following the reading of a second tape mark, and means operative to reset said register immediately before said coincidence units are rendered operative to transmit characters following the reading of a second tape mark.

6. In a system for reading and writing magnetic tape records wherein records are separated from each other by a multi-bit first and second tape mark having an intervening interrecord gap therebetween; a character register having inputs for receiving the bits of a character read from a magnetic record, output character transmission circuits extending from said register, means for generating and impressing a gating signal upon said transmission circuits during the reading of valid characters whereby such characters are gated through said transmission circuits, a coincidence circuit for recognizing a first tape mark in said character register, means responsive to an output of said coincidence circuit for suppressing said gating signal upon recognition of a first tape mark, means including said coincidence circuit for recognizing a second tape mark in said register, means responsive to said last named recognizing means for rendering operative said gating signal to transmit characters following the reading of a second tape mark, and means operative to reset said register immediately before said gating signal is rendered operative to transmit characters following the reading of a second tape mark.

References Cited in the file of this patent

UNITED STATES PATENTS

| | | |
|---|---|---|
| 2,558,853 | Kappeler | July 3, 1951 |
| 2,702,315 | Roderick | Feb. 15, 1955 |
| 2,782,398 | West et al. | Feb. 19, 1957 |
| 2,817,829 | Lubkin | Dec. 24, 1957 |
| 2,863,137 | Cox et al. | Dec. 2, 1958 |
| 2,923,589 | Curtis | Feb. 2, 1960 |
| 2,942,242 | Sharp | June 21, 1960 |